April 12, 1938.    V. W. KLIESRATH    2,113,656
VEHICLE
Filed Aug. 3, 1936    2 Sheets-Sheet 1
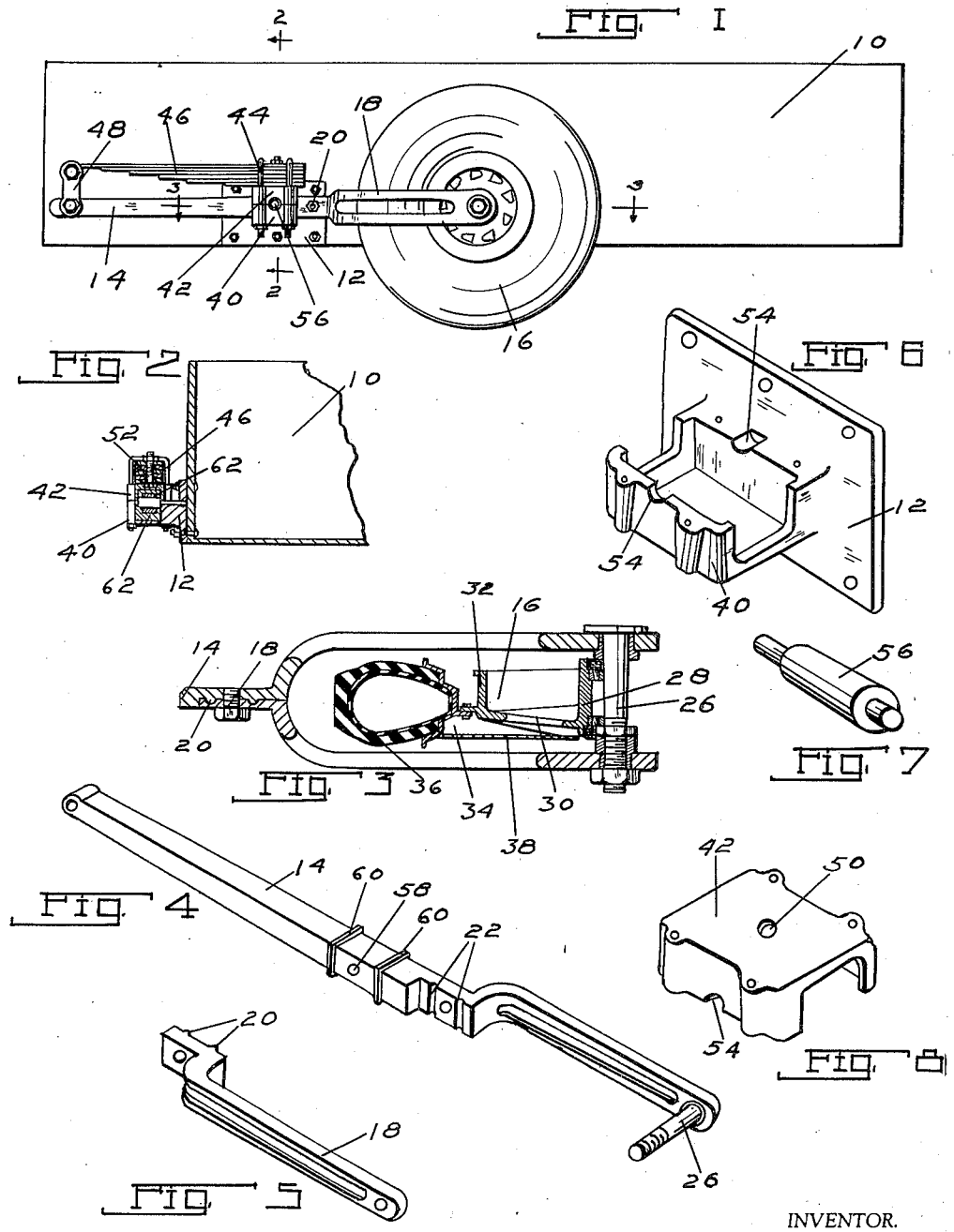
INVENTOR.
VICTOR W. KLIESRATH
BY
McConkey & Booth
ATTORNEYS.

April 12, 1938.  V. W. KLIESRATH  2,113,656
VEHICLE
Filed Aug. 3, 1936   2 Sheets-Sheet 2
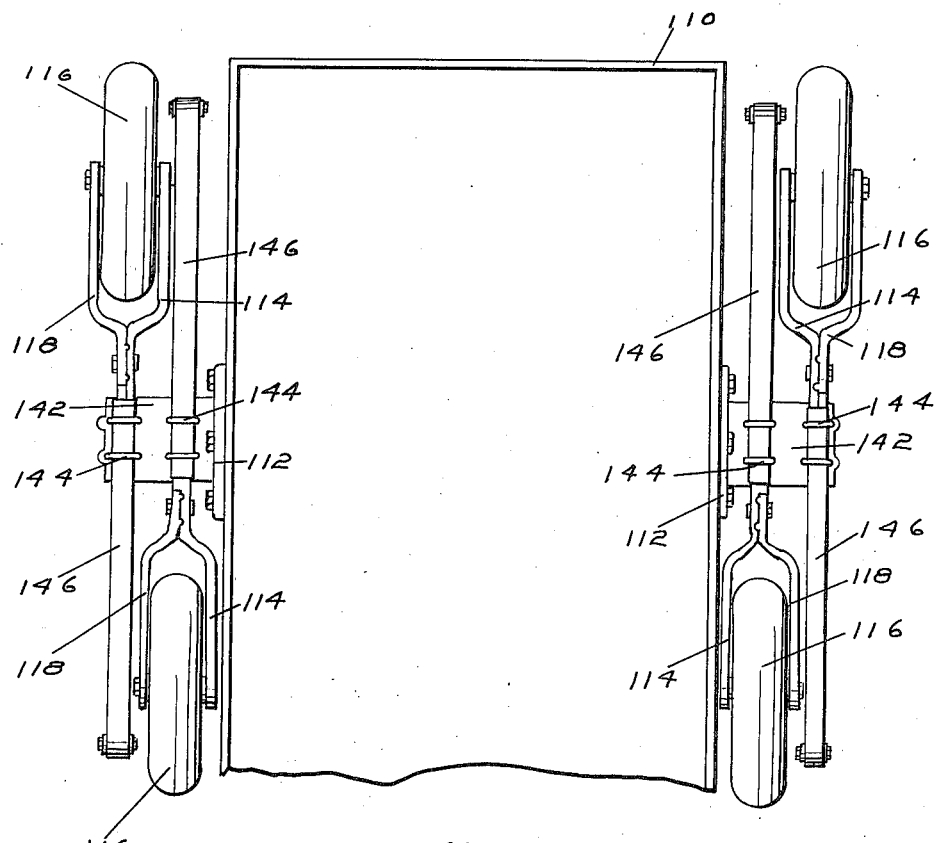
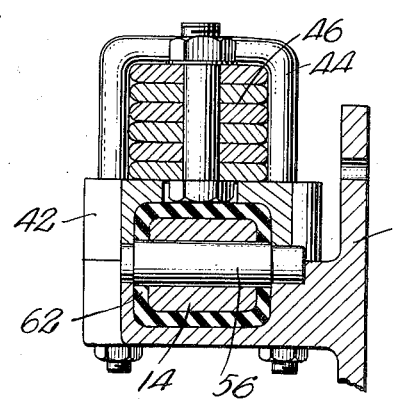
INVENTOR.
VICTOR W. KLIESRATH
BY
McConkey & Booth
ATTORNEYS.

UNITED STATES PATENT OFFICE 2,113,656

VEHICLE

Victor W. Kliesrath, South Bend, Ind., assignor to The Steel Wheel Corporation, Chicago, Ill., a corporation of New York Application August 3, 1936, Serial No. 93,931

5 Claims. (Cl. 267—19)

This invention relates to vehicles, and is illustrated as embodied in a novel spring suspension and wheel assembly for a trailer or the like.

An object of the invention is to provide a simple spring suspension which, with its wheel, forms an assembly capable of being readily secured to the trailer as such, and which preferably lies entirely outside the outline of the trailer body so that the body may be built with its bottom at the level of the minimum desired road clearance.

In one desirable arrangement, a bracket or the equivalent carried by the side of the trailer has generally centrally pivoted thereon a lever at one end of which is journalled the road wheel and the other end of which is connected to a spring secured to the bracket.

Preferably the mounting of the lever includes non-resilient-parts, such as blocks of rubber material or the like, yieldingly resisting pivotal motion of the lever in cooperation with the spring.

When my novel spring suspension is used on a four-wheel trailer, I prefer to provide, on each side of the trailer, a bracket or the like having two of the above-described levers, one with its wheel at its forward end and the other with its wheel at its rear end.

The above and other objects and features of the invention, including various novel arrangements and desirable particular constructions, will be apparent from the following description of the illustrative embodiments shown in the accompanying drawings, in which:

Figure 1 is a side elevation of a trailer provided with my novel spring suspension;

Figure 2 is a partial vertical section on the line 2—2 of Figure 1;

Figure 3 is a partial horizontal section on the line 3—3 of Figure 1;

Figures 4 and 5 are perspective views respectively of the two parts which are secured together to form the above-described lever;

Figures 6, 7, and 8 are perspective views of the three parts which, with blocks of rubber material or the like, make up the pivotal mounting for the lever;

Figure 9 is a top plan view of a four-wheel trailer embodying my invention; and

Figure 10 is an enlarged sectional view through the bracket.

The trailer illustrated in Figures 1 and 2 includes a body 10, of any suitable and desired form and construction, to the opposite sides of which are secured two wheel and spring suspension assemblies.

Each of these assemblies includes a bracket or the equivalent 12, bolted or otherwise secured to the trailer body, and provided with novel pivotal mounting means generally centrally engaging a lever made up, in the arrangement illustrated, of a main section 14 offset at one end to form one side of a fork for a road wheel 16, the other side of the fork being an auxiliary section 18 detachably secured at its end to the main section 14 by means such as a bolt 20 and interlocking tongues and grooves 22 and 24.

The fork so formed is provided with a suitable spindle 26 on which is journaled (by means of anti-friction bearings if desired) the wheel 16. The wheel, in the form illustrated, includes a central hub 28 journaled on the spindle 26, and which is integral with spokes 30 preferably formed integrally with a drum 32 for a suitable brake (not shown). The drum 32 is shown with a peripheral flange detachably bolted to an inner flange of a suitable ring 34 carrying the tire 36. If desired the outer face of the wheel may have a suitable cover plate 38.

The bracket 12 is shown formed with a lateral extension or socket 40, to which is secured a cap 42, for example by U-bolts 44 which also serve to clamp against the upper face of cap 42 the end of a quarter-elliptic leaf spring 46, the opposite end of which is connected to the end of the lever 14 by shackle links 48. The cap 42 may be formed with an opening 50 for a bolt 52 (Figure 2) which passes through the ends of the leaves of spring 46 to hold them against shifting.

The cap 42 and the socket 40 are formed with registering notches 54 providing substantial vertical but not horizontal clearance for the reduced ends of a pivot pin 56, the central portion of which fits into an opening 58 in the lever section 14.

The cap 42 and socket 40 embrace between them the portion of section 14 between ribs 60, suitable blocks 62 of rubber or other resilient non-metallic material being provided to limit the vertical motion of the pivot 56, and to resist angular motion of the lever 14—18, thereby cooperating with the spring 46.

Figure 9 illustrates the use of four of the above-described assemblies for a four-wheel trailer, one assembly of each pair (right and left) being reversed relatively to each other so that the two levers 114—118 swing in parallel vertical planes paralleling the sides of the trailer, so that the rear wheels 116 are further apart than the front wheels 116,—i. e. they have a greater tread.

As the only structural difference is in the size of the extensions or sockets formed on the brackets 112, the various parts are designated by reference characters 100 greater than the same parts in Figures 1–8.

While two illustrative arrangements have been described in detail, it is not my intention to limit the scope of the invention to those particular arrangements, or otherwise than by the terms of the appended claims.

I claim:

1. A wheel assembly for a trailer or the like comprising a bracket adapted to be secured to the side of the trailer and provided with pivotal mounting means, a lever generally centrally mounted on said means and having a road wheel journalled at one end thereof, and a spring secured at one end to said bracket and connected at its other end to the other end of said lever, said pivotal means including non-metallic parts resiliently resisting pivotal motion of said lever in cooperation with said spring.

2. A wheel assembly for a trailer or the like comprising a bracket adapted to be secured to the side of the trailer and provided with pivotal mounting means, two horizontal levers generally centrally mounted on said means, road wheels journalled respectively at the front end of one lever and at the rear end of the other lever, and oppositely-extending springs secured at their adjacent ends to said bracket and the opposite ends of which are connected respectively to the ends of said levers opposite their wheels, said pivotal means including non-metallic parts resiliently resisting pivotal motion of said levers in cooperation with said springs.

3. A wheel assembly for a trailer or the like comprising a bracket adapted to be secured to the side of the trailer and provided with pivotal mounting means, a cap for said bracket holding the means in place, a lever generally centrally mounted on said means and having a road wheel journalled at one end thereof, a spring secured at one end to said bracket and connected at its other end to the other end of said lever and common means for securing the cap and the spring to the bracket.

4. A wheel assembly for a trailer or the like comprising a bracket adapted to be secured to the side of the trailer and provided with pivotal mounting means, a lever generally centrally mounted on said means, an auxiliary section removably secured to said levers and forming therein a fork, a road wheel journaled between the ends of the fork, and a spring secured at one end to said bracket and connected at its other end to the other end of said lever, said lever swinging in a vertical plane paralleling the side of the trailer.

5. A wheel assembly for a trailer or the like comprising a bracket adapted to be secured to the side of the trailer and provided with pivotal mounting means, two horizontal levers generally centrally mounted on said means, auxiliary sections removably secured to said levers and forming forks therewith respectively at the front end of one lever and at the rear end of the other lever, road wheels journaled between said forks, and oppositely-extending springs secured at their adjacent ends to said bracket and the opposite ends of which are connected respectively to the ends of said levers opposite their wheels, said levers swinging in parallel vertical planes paralleling the side of the trailer.

VICTOR W. KLIESRATH.